June 2, 1931. A. ADAMS, JR., ET AL  1,807,950
CLEANSING SYSTEM AND DEVICE FOR AIR FILTERS
Filed June 13, 1929  3 Sheets-Sheet 1
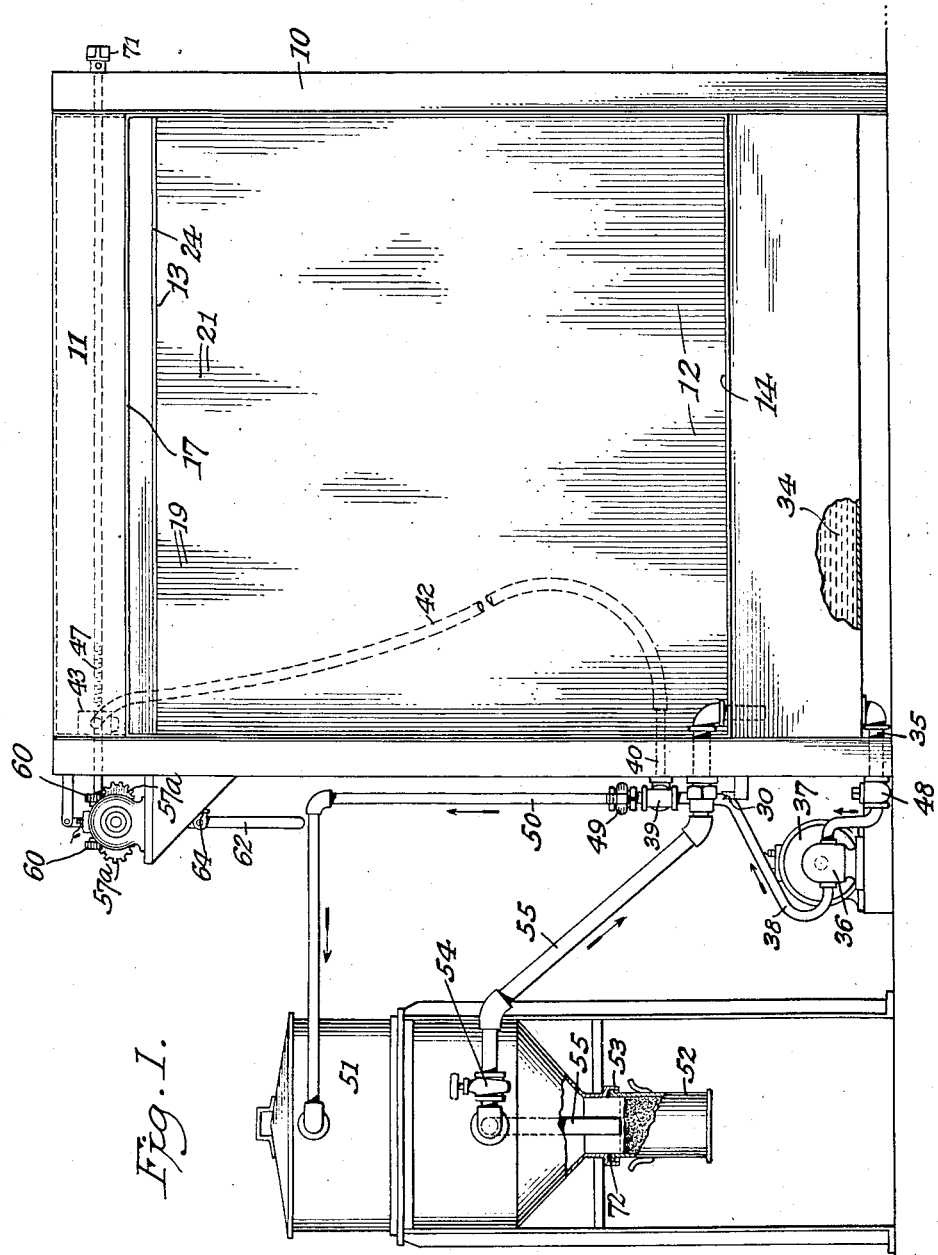
Inventors:
AUSTIN ADAMS, JR,
AND WILLIAM L. RICHARDS,
By their Attorney Julian J. Wittal June 2, 1931.  A. ADAMS, JR., ET AL  1,807,950
CLEANSING SYSTEM AND DEVICE FOR AIR FILTERS
Filed June 13, 1929    3 Sheets-Sheet 2
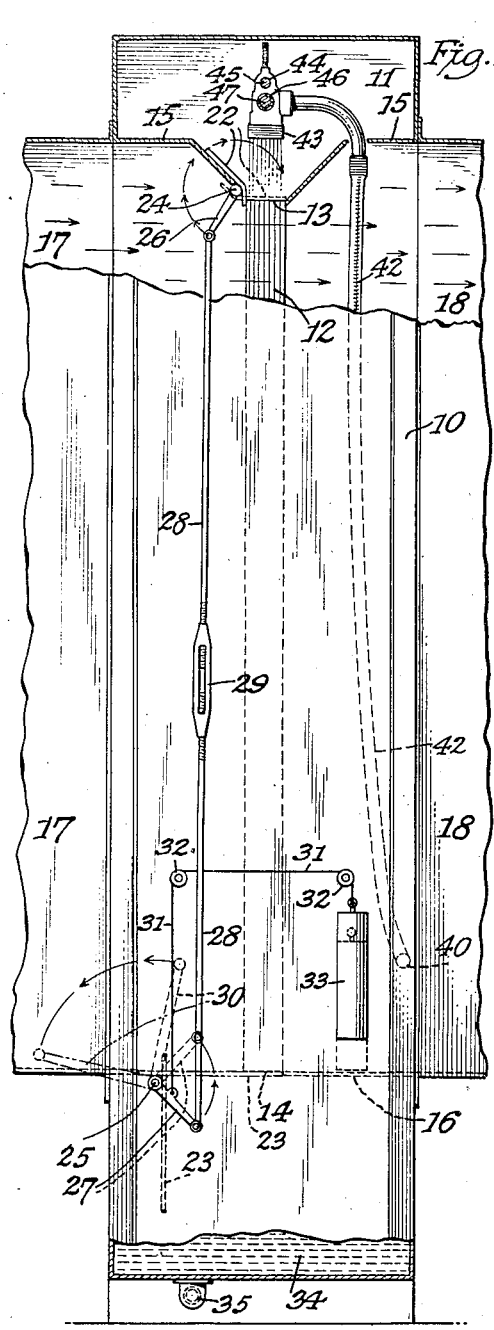
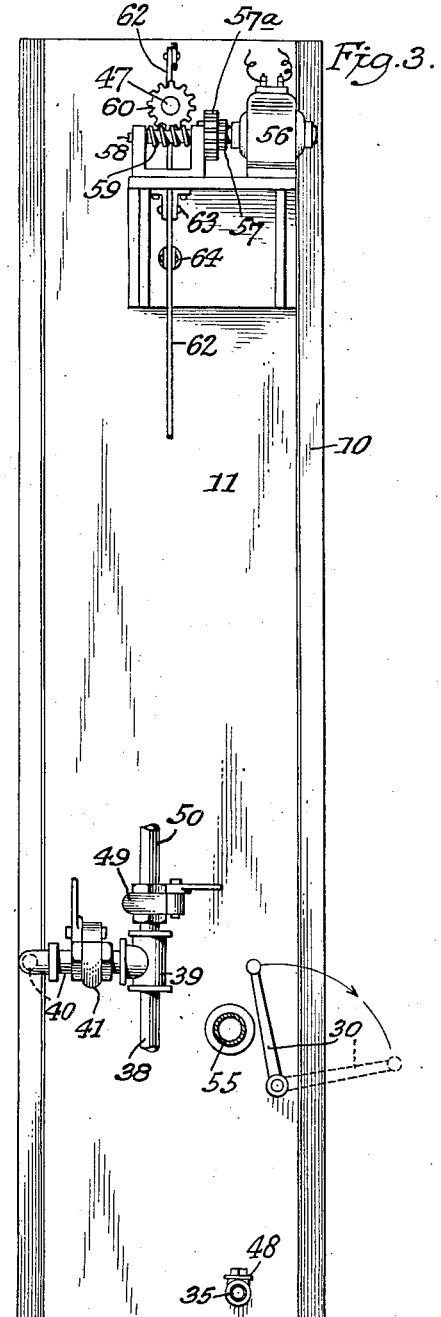
Inventors:
AUSTIN ADAMS, JR.
AND WILLIAM L. RICHARDS,
By their Attorney
Julian J. Wittal

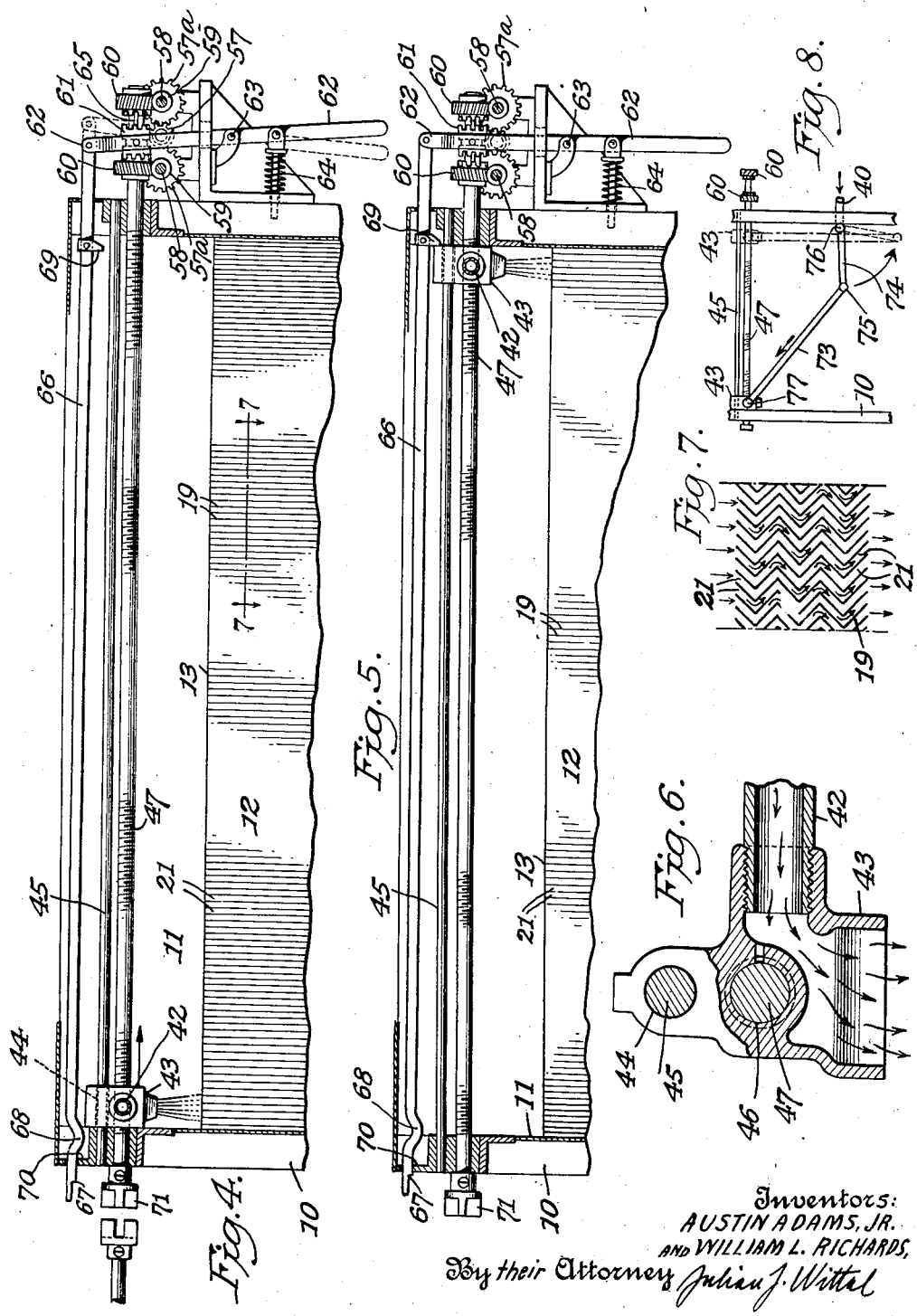

Patented June 2, 1931

1,807,950

UNITED STATES PATENT OFFICE

AUSTIN ADAMS, JR., OF BRIGHTWATERS, AND WILLIAM L. RICHARDS, OF LYNBROOK, NEW YORK, ASSIGNORS TO AMERICAN AIR FILTER COMPANY, OF LOUISVILLE, KENTUCKY, A CORPORATION OF DELAWARE

CLEANSING SYSTEM AND DEVICE FOR AIR FILTERS

Application filed June 13, 1929. Serial No. 370,549.

This invention relates to improvements in apparatus and a process for semi-automatically cleaning air filters, particularly of the larger type, for use in removing dust, dirt and other extraneous matter from air, power driven through tunnels or trunk lines.

To effectively collect extraneous matter from air in purifying the same, filters have been devised with vertically positioned spaced plates providing substantially parallel passages preferably extending the full height of the filter, said plates carrying a film or coating of an appropriate oil, which after performing during a determined period of air purifying service, is washed down by and with a falling stream of cleansing oil into a tank, from which both the dirty oil and the cleansing oil are power drawn into a suitable settling reservoir having an exchangeable dirt receiving canister or receptacle removably suspended from its bottom.

After the settling period, the oil cleared of dirt by the action of gravitation, or sedimentation, is siphoned from the said settling tank back into the said tank below the said air filter.

Arranged directly over but removed from the top of the air filter is a feed screw or worm connected with suitable power means whereby it may be turned in one direction and automatically reversed by appropriate trip means.

A spray nozzle may be mounted on the said feed screw and may have piped connections through suitable valves and power devices with the said tanks, whereby oil may be raised or pumped to and through the nozzle and sprayed down into the top of the air filter to cleanse the same of dirt as above set forth.

To prevent unpurified air from escaping through the top and bottom of the air filter and mingling with the purified air beyond, suitable dampers are provided to close the ends of the filter normally, but when the cleansing operation is going on, these dampers must be open to permit the free passage of the cleansing oil from the spray nozzle entirely through the filter from top to bottom.

These dampers may be constituted by plates mounted on rock shafts at one side of the filter, said shafts may be operated independently or extended at one end to receive operating arms connected by an adjustable link so that said dampers may be opened or closed simultaneously by manipulating a suitable handle on the extended end of one of said rock shafts, means being provided, such as a counterweight, for balancing the dampers in a closed or open position, no positive lock being necessary for that purpose.

We will now enter into a detailed description of the construction and relative arrangement of the parts embraced in the present and preferred embodiment of the invention in order to impart a full, clear and exact understanding of the said embodiment. We do not desire, however, to be understood as confining ourselves to the said specific construction and relative arrangement of parts inasmuch as in the future practice of the invention, various changes in the parts may be made in adapting the apparatus to various conditions of use.

In the drawings forming part of this specification similar reference characters are employed to designate corresponding parts throughout the several views, in which Fig. 1 is a general view of our improved filter cleaning apparatus and indicating the cleansing nozzle in the normal "at rest" position.

Fig. 2 is a side view of the filter casing broken away to disclose the upper portion of the filter and other parts within the casing, and also showing portions of the air conduit or tunnel.

Fig. 3 is an elevation of the opposite side of the filter casing and parts of the filter cleansing apparatus.

Fig. 4 is a cross sectional elevation through the top of the filter casing and showing a feed screw device and means for driving and reversing the same and a cleaning nozzle mounted thereon, said nozzle being at the extreme outer position and beginning its backward movement to the starting point.

Fig. 5 is a view similar to Fig. 4, but with the filter cleaning nozzle back at the normal position or starting point.

Fig. 6 is an enlarged detail sectional elevation of the filter cleaning nozzle.

Fig. 7 is an enlarged diagrammatic horizontal section through the air filter on the line 7—7 of Fig. 4.

Fig. 8 is a reduced view showing another form of pipe coupling for delivering oil to the traveling cleaning nozzle.

In the drawings 10 designates an upright frame preferably of angle plates or bars adapted to support a filter case 11, at about the vertical center of which a filter 12, is fixedly positioned and extends the entire width of the casing, but terminates short of the top and bottom thereof as at 13 and 14.

Arranged continuous with inner top and bottom walls 15 and 16 of the filter case 11, and with the side walls thereof and extending from either side of said case are inlet and outlet air conduits or tunnels 17 and 18.

The filter 12, may be constructed of angle plates 19, supported in spaced relation to form circuitous or indirect air spaces 21, as shown in Fig. 7 of the drawings. By this angle plate arrangement straight vertical passages extending the full height of the filter are provided for the downward passage of a cleansing oil through the filter, delivered by apparatus hereinafter described.

Normally the top and bottom of the filter should be closed to prevent the escape of air and for the purpose we supply upper and lower dampers 22 and 23, mounted on rock shafts, 24 and 25, extending through the filter case and the sides thereof to receive crank arms 26 and 27 respectively which may be operated independently or together if connected one to the other by a two part link 28, having a turnbuckle 29 for adjustment. These arms and link elements are outside of the filter casing at the right hand side thereof in Fig. 1, but may be at the left hand side, if so desired.

The lower rock shaft 25, is extended at the opposite end to receive a handle 30, by which the said dampers may be opened when the filter is being oil cleaned and closed after the cleaning operation.

To maintain the dampers 22 and 23 in a closed or open position, we attach to the lower crank arm 27, a wire or cable 31, which is passed over pulleys 32, and attached to a counterweight 33 as shown in Fig. 2 of the drawings.

We will now describe our improved apparatus for delivering cleaning and recharging oil to the filter and for cleaning the oil thus used for re-use over and over again.

At the bottom of the filter case 11, is a tank 34, in which the clean oil for cleaning a dirty filter is placed, and in this cleansing operation we draw the oil from the bottom of said tank through a pipe 35 by a pump 36, driven by a motor 37, and from said pump the oil is forced through a pipe 38, a T coupling 39, a branch pipe 40, supplied with a quick opening valve 41, thence through a preferably flexible tube and pipe connection 42 to a spray nozzle 43, which is formed with a smooth bore 44, to receive a guide rod 45, and with a threaded bore 46, in which a feed screw 47 operates.

When the above filter cleansing operation is taking place, a valve 48 in the pipe 35, and the valve 41 in the branch pipe 40, must be open while a quick opening valve 49, in a pipe 50, connected to the top of a settling reservoir 51, must be closed. A three-way valve may be substituted for the valves 41 and 49 to accomplish the same result, directing the pump discharge either to nozzle 43 or to settling reservoir 51, as required.

After the filter cleansing operation is completed, the oil, now all back in the tank 34, is full of suspended dirt and must be cleaned for re-use, therefore, we close the valve 41 in the branch pipe 40 and open the valve 49 in the pipe 50 and start motor 37 which again operates the pump 36, to draw the dirty oil from tank 34 upwardly through pipes 35 38, coupling 39, valve 49 and pipe 50 into the settling reservoir 51, where the oil is allowed to remain until all sludge or dirt has settled into a canister or receptacle 52 which is connected to the settling reservoir 51 by an ordinary bayonet or other quickly detachable joint 53, leakage being prevented by gasket 72.

When the oil is cleared by sedimentation of all sludge or dirt, and is to be used again, a valve 54 in a pipe line 55, is opened and the clean oil is siphoned into the tank 34 ready for use.

To cleanse the filter uniformly from side to side we provide suitable means for moving the nozzle 43, including a motor 56 having a drive pinion 57 (see Fig. 3) in mesh with opposite gears 57a on parallel shafts 58 with oppositely pitched worms 59, engaging worm wheels 60 loose on an extended end of the feed screw 47. The worm wheels have clutch members adapted to be engaged alternately by a clutch sleeve 61, slidable on said extended end by a shift lever 62, pivoted at 63 and backed by a spring 64 acting to urge the upper end of the shift lever inwardly into the position shown in Fig. 4. The clutch sleeve is rotated with the feed screw by a feather 65 entering a groove therein.

The direction of travel of the nozzle 43 on the feed worm 47, is controlled by a trip bar 66, having a shoulder means 67 near its free end, a downward bend 68 and a trip lug 69. When the lever is thrown to the dotted position of Fig. 4, the bar 66 is drawn over until the shoulder 67 drops behind a keeper 70 where it will lock the clutch causing the nozzle to move to the left, and when said nozzle reaches the bend 68 of the trip bar, it will raise it and release the said shoulder, permitting the spring 64 to force the clutch sleeve into engagement with the opposite clutch member and the screw will be reversed, thus moving the nozzle to the right until it contacts with the lug 69, causing the clutch sleeve to move into a neutral position when the screw will stop rotating.

The feed screw may be provided with a coupling head 71 to engage another head on a companion filter at the side so that two or more filters may be coupled together and operated by one motor.

In Fig. 8 of the drawings a modified form of pipe connections is shown for conveying cleaning oil from the pipe 40 to the spraying nozzle 43 which consists of pipes 73 and 74 connected one to the other by a swivel open joint 75 through which oil may flow. The ends of said pipes are connected by similar swivel open joints 76 and 77 to the feed pipe 40 and the nozzle 43 respectively.

What we claim is:

1. In combination with an air filter having vertically arranged spaced plates providing air passages, a tank for storing purified oil, a settling reservoir, a receptacle detachably carried thereby, a spraying nozzle movable over the filter; valved pipe connections between the tank and the nozzle and between the tank and the settling reservoir adapted for alternate service, power means for causing oil to flow from said tank through said connections, and means for conveying clarified oil from said reservoir back to said tank.

2. In combination with an air filter having vertically arranged spaced plates providing air passages therethrough, a storage tank for oil under said filter and a nozzle above the same, means for conveying the fluid contents of said tank to and through said nozzle to cleanse the surfaces of said plates, means for removing foreign matter from the fluid thus used, and means for refilling the tank with purified fluid for re-use.

3. An apparatus for cleaning air filters having vertically arranged spaced plates providing air passages from top to bottom, comprising a storage tank for oil, a rotating screw and means for driving and reversing the same, a nozzle mounted to travel on said screw, a settling reservoir, a separable container carried thereby, pipe connections between the storage tank, nozzle and settling reservoir and means for forcing the contents of said tank through said connections.

4. An apparatus for cleaning air filters having vertically arranged spaced plates providing air passages from top to bottom, comprising a container for oil arranged under the filter, a rotatable screw extending across said filter above the same and in vertical alignment therewith, means for driving and reversing said screw, a nozzle in threaded engagement on said screw, pipe connections between the said container and said nozzle, means for forcing the contents of said container upwardly to and through said nozzle and downwardly through the vertically extending passages of said filter and means for cleaning the oil thus used for use again.

5. Air filter apparatus comprising a filter element including vertically arranged spaced plates, a tank positioned below the bottom edges of said plates, a nozzle positioned above the top edges of said plates, means for moving said nozzle across said top edges, and a damper between said top edges and said nozzle.

6. Air filter apparatus comprising a filter element including vertically arranged spaced plates, a tank positioned below the bottom edges of said plates, a damper between an upper edge of said tank and the bottom edges of said plates, a nozzle positioned above the top edges of said plates, and means for moving said nozzle across said top edges.

7. Air filter apparatus comprising a filter element including vertically arranged spaced plates, a tank positioned below the bottom edges of said plates, a lower damper between an upper edge of said tank and the bottom edges of said plates, a nozzle positioned above the top edges of said plates, means for moving said nozzle across said top edges, an upper damper between said top edges and said nozzle, and means for operatively connecting said upper and lower dampers whereby they may be operated simultaneously.

Signed at New York, in the county of Kings, and State of New York, this 6th day of June, 1929.

AUSTIN ADAMS, Jr.
WILLIAM L. RICHARDS.